United States Patent
Ribas et al.

(10) Patent No.: US 7,437,176 B1
(45) Date of Patent: Oct. 14, 2008

(54) METHOD AND SYSTEM FOR REDUCING PILOT POLLUTION BY SYSTEMATICALLY ADJUSTING SECTOR POWER ALLOCATIONS

(75) Inventors: Hector M. Ribas, Overland Park, KS (US); Jason P. Sigg, Olathe, KS (US); Meng Y. Yew, Olathe, KS (US); Abhijit V. Apte, Overland Park, KS (US); Nandish M. Chalishazar, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 625 days.

(21) Appl. No.: 11/080,768

(22) Filed: Mar. 15, 2005

(51) Int. Cl.
*H04B 7/00* (2006.01)

(52) U.S. Cl. .................. 455/522; 455/69; 455/63.1; 455/126

(58) Field of Classification Search ............ 455/522, 455/69, 434, 436, 442, 452.1, 452.2, 456.1, 455/456.3, 13.4, 515, 446, 422.1, 63.1, 67.11, 455/126, 63.2, 115.1; 370/320, 254, 318, 370/468
See application file for complete search history.

(56) References Cited

U.S. PATENT DOCUMENTS

| | | | |
|---|---|---|---|
| 6,678,257 B1 * | 1/2004 | Vijayan et al. | 370/320 |
| 2003/0134655 A1 * | 7/2003 | Chen et al. | 455/522 |
| 2004/0203809 A1 * | 10/2004 | Au et al. | 455/450 |
| 2006/0209721 A1 * | 9/2006 | Mese et al. | 370/254 |

* cited by examiner

*Primary Examiner*—John J. Lee

(57) ABSTRACT

A method and system are disclosed for reducing pilot pollution in a wireless communication system by systematically (i) identifying areas of sector overlap and (ii) for each area, adjusting power allocation in one or more of the overlapping sectors so as to create a dominant sector and to reduce the total noise from other sectors. A preferred embodiment of the invention involves collecting RF performance data, filtering the data to focus on areas having threshold low forward link data rate, further filtering the data to focus on areas in which the low forward link data rate is likely the result of pilot pollution, selecting a geographic region in which to make a sector power adjustment, and making a sector power adjustment in the selected region in an effort to reduce pilot pollution and increase forward link data rate. The invention is particularly advantageous in a hybrid EV-DO/1xRTT system.

18 Claims, 5 Drawing Sheets

METHOD AND SYSTEM FOR REDUCING PILOT POLLUTION BY SYSTEMATICALLY ADJUSTING SECTOR POWER ALLOCATIONS

FIELD OF THE INVENTION

The present invention relates to wireless communications and, more particularly, to management of radio frequency emissions.

DESCRIPTION OF RELATED ART

In a wireless communication system operating according to the IS-856 standard (commonly referred to as EV-DO) or the like, the data rate received by a mobile station (or "access terminal") on the forward link is proportional to the signal-to-noise ratio (C/I) of the pilot signal received by the mobile station on the forward link. In particular, IS-856 defines a set of correlations between C/I ratios and data rates, such that, the higher the C/I ratio, the higher the data rate, and the lower the C/I ratio, the lower the data rate. Further, IS-856 dictates that a mobile station should measure C/I on the mobile station's preferred sector and then request the base station to transmit on the forward link at the data rate corresponding to that measured C/I. (Generally, the base station will then transmit at that requested data rate, although the actual data rate may vary somewhat, depending on factors such as actual traffic load at the time.)

Additionally, under IS-856, each sector has an allocated power level (i.e., its power amplifier (PA) is set to output at a particular sector power level), and the sector transmits its pilot signal at a certain percentage (typically a high percentage) of the sector's total allocated power. Thus, the pilot signal in each sector is largely a fixed power level, based on the power generally allocated to the sector. Since the data rate on the IS-856 forward link is proportional to the signal-to-noise ratio, it follows that a mobile station will operate at (or at least request operation at) a lower data rate when more noise is present in the sector.

One factor that adds to the noise in an IS-856 sector is pilot pollution, i.e., interference from pilot signals of other sectors. This phenomenon typically occurs at border areas, where sectors overlap. Under IS-856, a mobile station operates on just one sector at a time, usually the sector having the highest C/I detected by the mobile station. If the mobile station detects other pilots at the same time, those other pilots will increase the denominator, I, of the serving sector's C/I ratio, thereby decreasing the C/I ratio and thus also decreasing the forward link data rate (or at least the requested forward link data rate).

One solution to this problem is to point the antennas of the overlapping sectors in a more downward direction, such that they do not overlap as much, i.e., to minimize the area of overlap. Once the area of overlap is minimized or eliminated, pilot pollution will be minimized or eliminated, and mobile stations will be able to request and likely receive higher forward link data rates.

While this solution works well in theory, a problem arises in practice where IS-856 coverage is provided as an overlay on a legacy system, such as an IS-95 or IS-2000 system. In typical overlay or "hybrid" system, the antennas on each base station tower function to provide both IS-856 coverage and legacy coverage. Unfortunately, however, the power allocated to a given sector (defined by a given set of antennas) in most legacy systems is usually lower than the power allocated to the same sector (defined by the same set of antennas) under IS-856. Therefore, if the hybrid antennas are turned downward to minimize or eliminate sector-overlap (and thus pilot pollution) under IS-856, the result can be a coverage hole in the legacy system. Consequently, an improved solution is still desired.

SUMMARY

The present invention provides for reducing pilot pollution by systematically (i) identifying areas of sector overlap and (ii) for each area, adjusting power allocation in one or more of the overlapping sectors so as to create a dominant sector and to reduce the total noise from other sectors. By adjusting the sector power allocation to reduce pilot pollution, the invention can avoid the need to direct the antennas downward, and so the invention can avoid negatively impacting operation of a co-existing system (e.g., a legacy system). (By the same token, the invention does not preclude changing antenna directions to further solve the pilot pollution problem. The invention merely provides an additional or alternative solution.)

Various aspects and advantages of the invention will become more readily apparent to those of ordinary skill in the art by reading the following detailed description, with reference where appropriate to the accompanying drawings. Further, it should be understood that this summary and the detailed description and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

1. Example Network Architecture a. Cellular Wireless Communications

Figure 1:
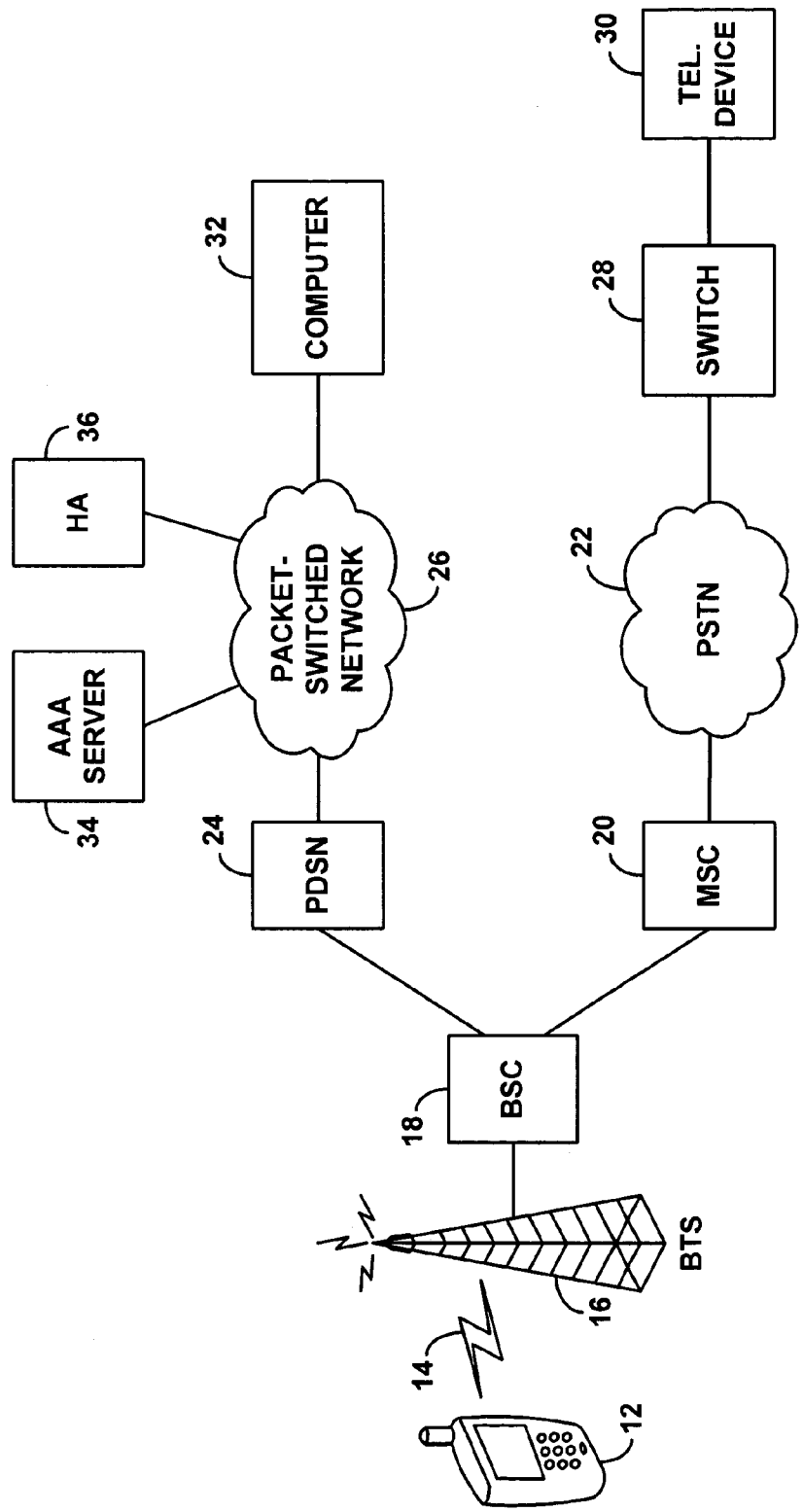
FIG. 1 is a block diagram of a wireless communication system in which an exemplary embodiment of the invention be carried out.

FIG. 1 depicts an example cellular wireless communication system adapted to provide wireless communication service for a mobile station 12. Mobile station 12 communicates over an air interface 14 with a base transceiver station (BTS) 16, which is then coupled or integrated with a base station controller (BSC) (or "radio network controller" (RNC)) 18. BSC 18 is then coupled (i) with a mobile switching center (MSC) 20 that provides connectivity with the public switched telephone network (PSTN) 22 and (ii) with a packet data serving node (PDSN) 24 that provides connectivity with a packet-switched network 26 such as the Internet and/or a wireless carrier's private core packet-network. Sitting as another node on PSTN 22 is a remote switch 28 that provides connectivity with a remote telephone device 30. And sitting as nodes on packet-switched network 26 are a remote computer 32, an authentication, authorization, and accounting (AAA) server 34, and a mobile-IP home agent (HA) 36.

With this arrangement, depending on how mobile station 12 is equipped, mobile station 12 may be able to engage in a telephone call with remote telephone device 30, and/or mobile station 12 may be able to engage in packet-data communication (e.g., IP communication) with remote computer 32.

To place a telephone call to remote device 30, for instance, mobile station 12 may send a call origination signal over an air interface access channel to BTS 16 and via BSC 18 to MSC 20. MSC 20 may then direct BSC 18 to assign an air interface traffic channel for use by mobile station 12 and may further set up the call via PSTN 22 to remote switch 28 and in turn to remote device 30. Similarly, when MSC 20 receives a call from remote device 30 destined to mobile station 12, MSC 20 may page mobile station 12 over an air interface paging channel and, when the mobile station answers, connect the call over an air interface traffic channel to the mobile station.

To engage in packet-data communication with remote computer 32, mobile station may send a packet-data origination request (e.g., a UATI (Universal Access Terminal Identifier) request and a connection request) over the air to BSC 18, and BSC 18 may signal to PDSN 24. BSC 18 and/or PDSN 24 may communicate with AAA server 34 in order to authenticate the mobile station 12, and PDSN 24 may negotiate with the mobile station to establish a data link such as a point-to-point protocol (PPP) session for instance. Further, the PDSN 20 may send a foreign agent challenge message to the mobile station, and the mobile station may respond with a mobile-IP registration request (MIP RRQ), which the PDSN may forward to HA 28. The HA may then assign an IP address for the mobile station to use, and the PDSN may pass that IP address via the BSC to the mobile station. Given the IP address, the mobile station may then communicate with remote computer 32 largely in the same manner as any other IP node would.

Figure 2:
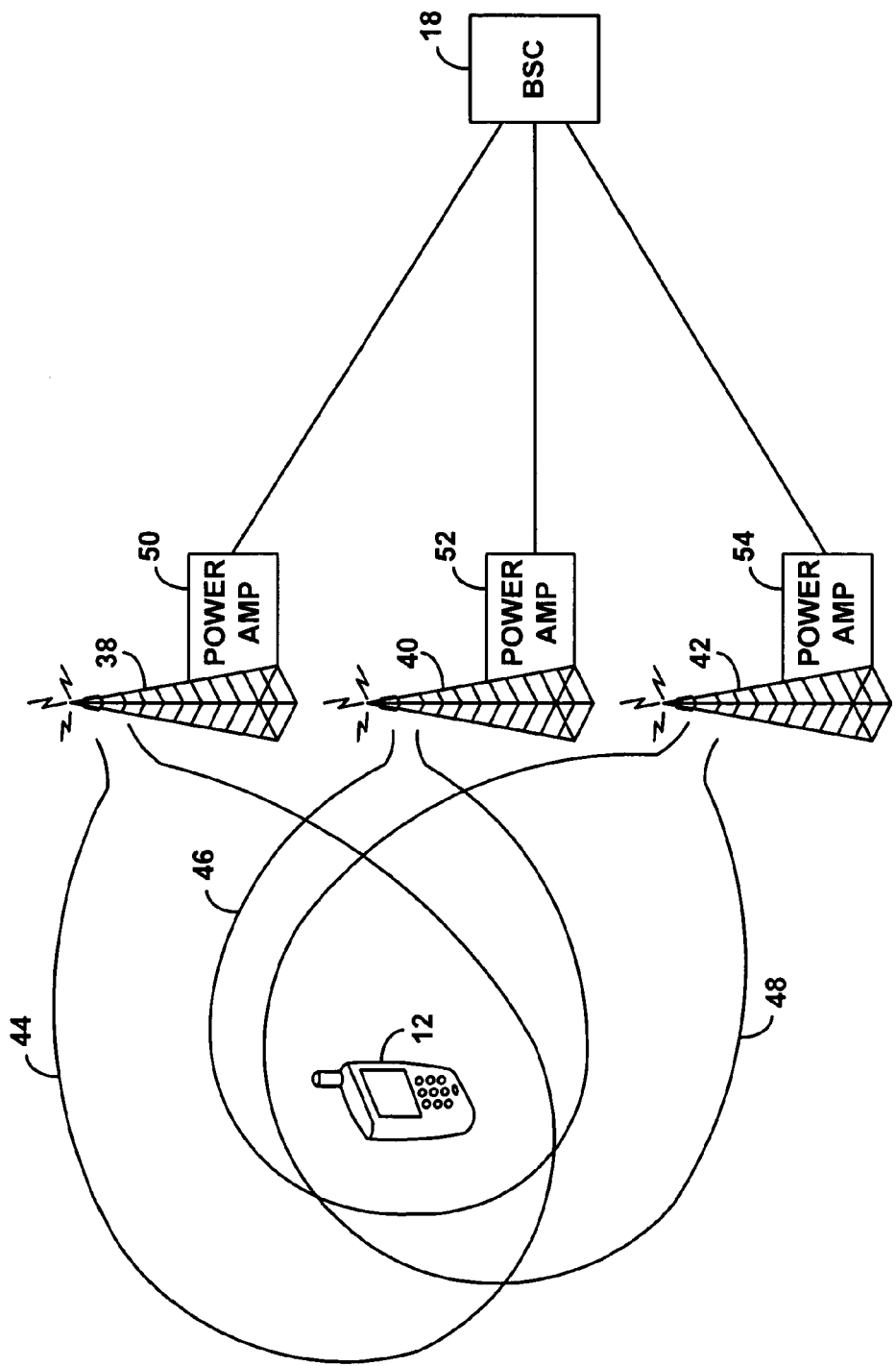
FIG. 2 is a block diagram depicting multiple representative base transceiver stations and sectors covering a service area.

In practice, BSC 18 may serve multiple BTSs. Each BTS may then radiate to define a given cell and a plurality of cell sectors. FIG. 2 illustrates a portion of this arrangement. As shown in FIG. 2, BSC 18 is coupled with three BTSs 38, 40, 42, each of which radiates to define a respective sector (or other wireless coverage area) 44, 46, 48, and mobile station 12 is shown sitting at a point of overlap of the three sectors. (In reality, each BTS will likely define more than one sector, but only one sector from each BTS is shown here for simplicity.) With this arrangement, mobile station 12 can theoretically operate in any of the sectors and can communicate on packet network 22 via its serving BTS, and via BSC 18 and PDSN 20.

FIG. 2 also illustrates at each base station a representative power amplifier 50, 52, 54 for each illustrated sector. Each power amplifier preferably has an adjustable gain that can be set (automatically or manually) in order to control the power of forward link transmissions in the sector.

Throughout this description, the term "base station" will refer to a radio access network element such as a BTS, a BSC, or combination BTS/BSC (and/or an MSC), for instance. The term "radio network controller" (RNC) may also be used to refer to a BSC or more generally to a base station, usually in the context of IS-856 communications. Further, the term "radio access network" or "radio network" refers generally to any system that provides a wireless access channel through which a mobile station can gain access to resources, such as to communicate on a packet-switched network for instance.

b. Legacy CDMA Communications

In a conventional or "legacy" Code Division Multiple Access ("CDMA") wireless network compliant with the well known IS-2000 standard, each cell employs one or more carrier frequencies, typically 1.25 MHz each, and each sector is distinguished from adjacent sectors by a pseudo-random number offset ("PN offset"). Further, each sector can concurrently communicate on multiple different channels, distinguished by "Walsh codes". When a mobile station operates in a given sector, communications between the mobile station and the BTS of the sector are carried on a given frequency and are encoded by the sector's PN offset and a given Walsh code.

Air interface communications are divided into forward link communications, which are those passing from the base station to the mobile station, and reverse link communications, which are those passing from the mobile station to the base station. In an IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

Under IS-2000, a mobile station can communicate with a number of "active" sectors at a time. Depending on the system, the number of active sectors can be up to three or six (currently). The mobile station receives largely the same signal from each of the active sectors and, on a frame-by-frame basis, selects the best signal to use.

A mobile station maintains in its memory a list of the sectors in its "active" set. In addition, it maintains in its memory a list of "candidate" sectors (typically up to six), which are those sectors that are not yet in the active set but that have sufficient signal strength that the mobile station could demodulate signals from those sectors. Further, the mobile maintains a list of "neighbor" sectors, which are those sectors not in the active set or candidate set but are in close vicinity to the mobile station. All other possible sectors are members of a "remaining" set.

To facilitate a determination of which sectors should be in the mobile station's "active" set, all base stations emit a pilot channel signal in each sector, typically at a power level higher than other forward link signals. A mobile station then constantly measures the energy of each pilot that it receives and computes a "pilot strength" as the ratio, $E_c/I_o$, of that pilot energy to the total detected energy. The mobile station then notifies a primary base station (a base station currently serving the mobile station) when pilot strength falls above or below designated thresholds. And the base station, in turn, provides the mobile station with an updated list of active pilots.

c. High Rate Packet-Data Communications

Under IS-2000, the highest rate of packet-data communications theoretically available on a fundamental traffic channel of the forward link is 9.6 kbps. In order to provide higher rate packet-data service to support higher bandwidth applications, the industry has introduced a new "high rate packet data (HRPD) system," which is defined by industry standard IS-856.

IS-856 leverages the asymmetric characteristics of most IP traffic, in which the forward link typically carries a heavier load than the reverse link. Under IS-856, the forward link uses time division multiplexing (TDM), in order to allocate all power in a sector to a given user at any moment, while the reverse link retains largely the traditional IS-2000 code division multiplexing (CDM) format, albeit with the addition of a "data rate control" (DRC) channel used to indicate the supportable data rate and best serving sector for the forward link. The end result is that a mobile station operating under IS-856 can, in theory, receive packet-data at a rate of at least 38.4 kbps and up to 2.4 Mbps.

The IS-856 forward link is divided into time slots of length 2048 chips, and each time slot is further time division multiplexed to carry various channels, including a pilot channel, a Medium Access Control (MAC) channel, and, if any traffic exists, a forward traffic channel and a "control" channel. As in IS-2000, each sector in IS-856 is defined by a PN offset, and the pilot channel carries an indication of the sector's PN offset. Also as in IS-2000, a mobile station operating under IS-856 monitors the pilot signal emitted by various sectors as a basis to facilitate active set management, i.e., to facilitate handoff from one sector to another.

IS-856 introduces a "virtual soft handoff" concept, in which a mobile station communicates with the network on just a "best" sector of its active set at any given time. As in IS-2000, the mobile station monitors the signal strength of pilot signals emitted by various sectors, and the mobile station similarly uses threshold handoff parameters as a basis to trigger the addition of a sector to the mobile station's candidate set. More particularly, under IS-856, a mobile station monitors the signal strength of all pilots that it can detect and computes for each sector a signal-to-noise ratio, C/I, as the ratio of (i) C=pilot strength of the sector to (ii) I=total signal level of all detected pilots. Further as in IS-2000, the mobile station then sends a revised candidate set to the network, and the network decides whether to revise the mobile station's active set. If the network decides to update the mobile station's active set, the network sends an message to the mobile station and further instructs each sector to communicate with the mobile station.

Unlike IS-2000 in which forward traffic information is routed to all sectors in the mobile station's active set, forward traffic under IS-856 is routed to only a "best" sector that the mobile station selects from its active set, typically the sector that has the strongest pilot strength (or, more particularly, the highest signal to noise ratio (C/I)) detected by the mobile station. In practice, the mobile station will monitor the pilot signals of the sectors in its active set, and will include in its DRC (on the reverse link) an indication (e.g., the PN) of the selected serving sector. Only that sector will then serve the mobile station with forward link packets. Thus, a mobile station may quickly hand off from one IS-856 serving sector to another by simply instructing the base station which sector it intends to communicate with.

The pilot signal of a selected IS-856 sector is used as a basis to estimate channel conditions and to facilitate rate adaptation. In this regard, as noted above, IS-856 defines a mapping between values of C/I and forward link data rates. Based on the C/I that the mobile station computes for its selected sector, the mobile station will use the defined mapping to select a particular data rate. And the mobile station will include in its DRC a request to receive forward link communications at that data rate. According to IS-856, the higher the C/I, the higher the requested data rate, and the lower the C/I, the lower the requested data rate.

Upon receipt of the DRC from the mobile station, the base station will decide whether or not it will grant the mobile station's requested forward link data rate. In this regard, the base station will apply a scheduling algorithm to determine which requests to grant and which requests to deny. The scheduling algorithm is vendor-specific and can therefore take various forms. If the base station decides to grant the request, the base station will then seek to deliver data to the mobile station at the requested rate.

d. Hybrid IS-2000/IS-856 Systems

Given the proliferation of legacy IS-2000 systems, IS-856 was designed to be backwards compatible and to facilitate "hybrid" operation. A "hybrid access terminal," in this particular scenario, is defined as a mobile station that can operate on both IS-2000 and IS-856 networks. (A hybrid terminal may more generally be any terminal that can operate on at least two air interface protocols.) A typical hybrid terminal, for instance, may be capable of receiving voice, short message service (SMS) messages, and dedicated channel data services on IS-2000 networks, as well as engaging in high-speed packet data service on IS-856 networks.

In a hybrid system, IS-2000 and IS-856 coverage are provided on different carrier frequencies, each of which is 1.25 MHz in bandwidth for consistency with legacy operation. Further, most IS-856 systems are provided as overlays on existing IS-2000 systems, such that a given BSC provides either IS-2000 coverage or both IS-2000 and IS-856 coverage. For an IS-2000 sector, the BSC may have just an IS-2000 circuit card. For a hybrid IS-2000/IS-856 sector, on the other hand, the BSC may have both an IS-2000 circuit card to facilitate IS-2000 operation and an IS-856 circuit card to facilitate IS-856 operation. Further, a hybrid IS-2000/IS-856 sector typically uses a common antenna or antenna structure, which can give rise to the problem noted above.

2. Exemplary Embodiment

Figure 3:
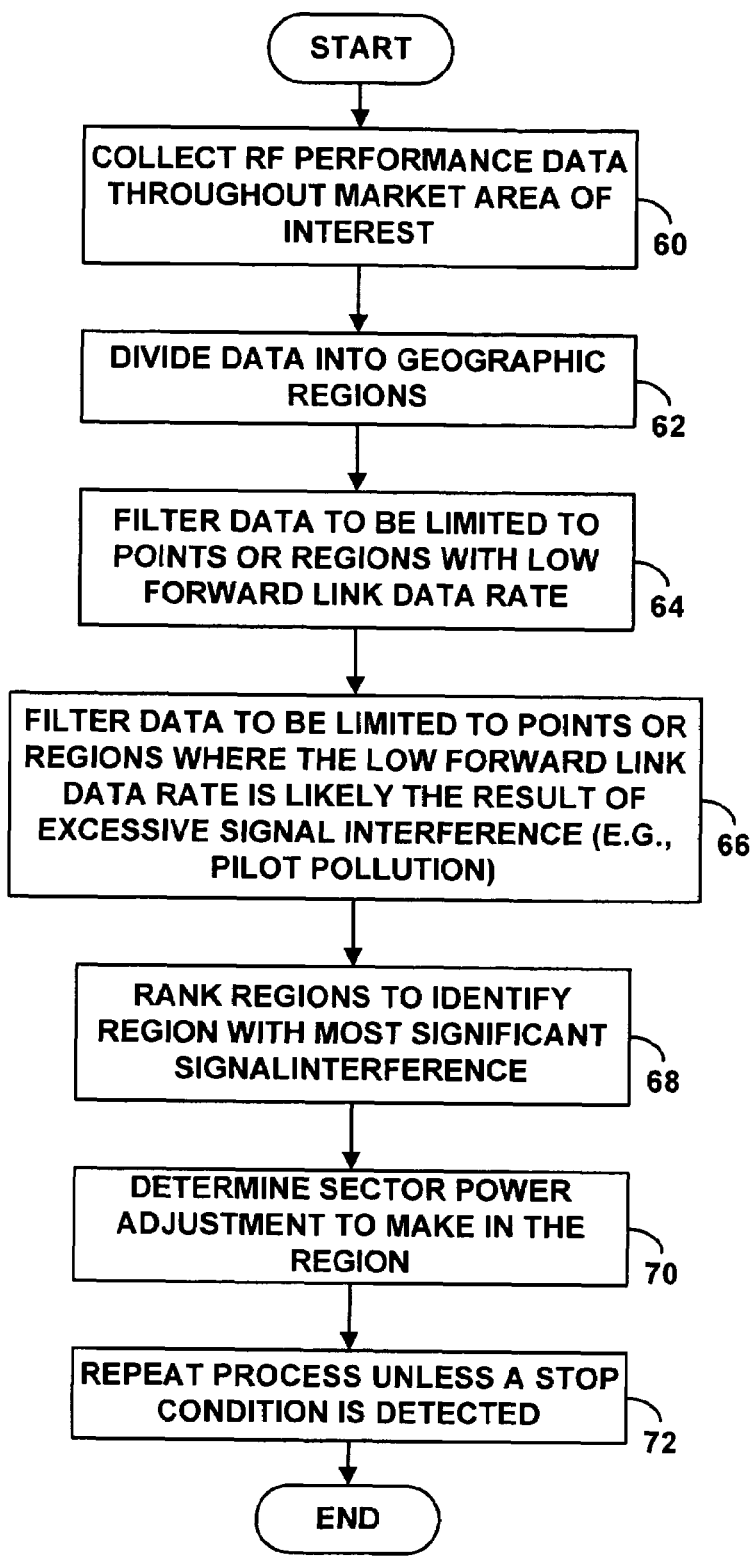
FIG. 3 is a flow chart depicting functions that can be carried out in accordance with the exemplary embodiment.

FIG. 3 is a flow chart depicting functions carried out in accordance with the exemplary embodiment of the invention. It should be understood, of course, the functions and process flow illustrated here, like other functions and elements described herein, are examples only and that variations are possible within the scope of the invention.

As shown in FIG. 3, at step 60, a computer system collects RF performance data for a market area of interest, including records of forward link data rate per geographic point or region within the market area. Preferably, the RF performance data will include drive test data collected by one or more drive test modules and network data collected by one or more network entities such as BSC 18 (and/or MSC 20) for instance. At step 62, the computer system then divides at least a portion of the data into geographic regions or "bins" to facilitate further analysis.

At step 64, the computer system then filters at least a portion of the collected data to include just those geographic points or regions where the forward link data rate is sufficiently low to be considered problematic, i.e., possibly the result of pilot pollution. Next, at step 66, the computer system filters the data further to be limited to those points or regions where the low forward link data rate is likely the result of excessive signal interference such as pilot pollution rather than being likely the result of some other factor such as excessive user demand.

At step 68, the computer system then ranks or scores the regions to identify which region has the most significant problem, preferably in terms of signal-interference. And at step 70, the computer system determines at least one power adjustment to make in that region in an effort to reduce pilot pollution, and power is adjusted accordingly. At step 72, the computer system then repeats this process, unless a stop condition is detected.

As noted, this process is preferably carried out by a computer system. The computer system, which can be owned and operated by the wireless carrier that serves the market area at issue, can take various forms. By way of example, the computer system can take the form of one or more computers, networked or otherwise connected together, adapted to receive input-data as noted above, to carry out the functions noted above, and to provide output signals regarding power adjustments as noted above.

Figure 4:
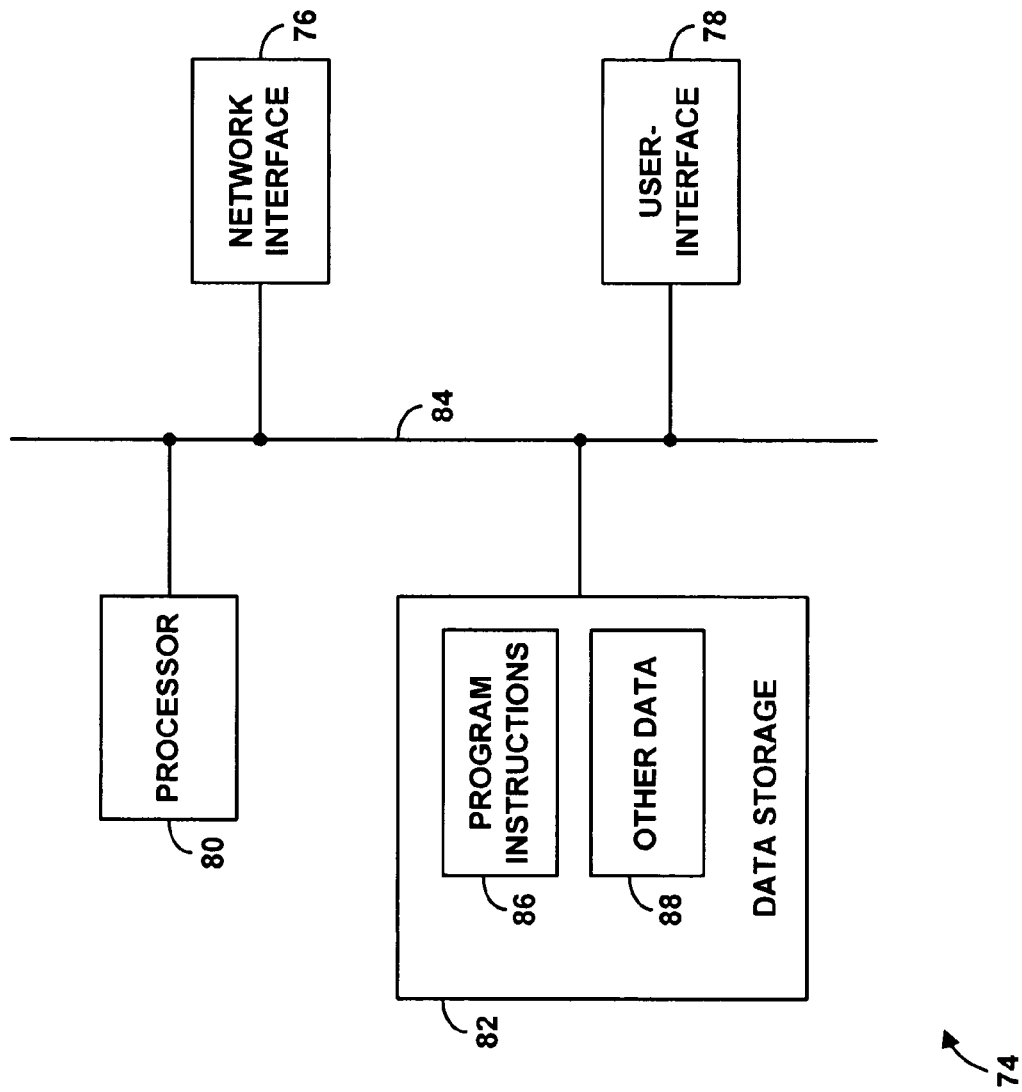
FIG. 4 is a block diagram depicting functional components of a computer system for carrying out the exemplary embodiment.

FIG. 4 is a simplified block diagram depicting functional components of such a computer system 74. The example computer system 74 includes a network interface 76, a user-interface 78, a processor 80, and data storage 82, all of which are communicatively linked together by a system bus, network, or other mechanism 84.

Network interface 76 provides for connection with a local area network, though which the computer system 74 can receive input data (e.g., network and device performance data) from one or more entities, and through which the computer system 74 can provide output data (e.g., instructions to adjust sector power levels) to one or more entities. The network interface 64 may comprise an Ethernet network interface card, for instance.

User-interface 78 provides for interaction with a user, such as to receive input from a user and provide output to a user. The user-interface 78 may thus include input mechanisms such as a keyboard and mouse, and output mechanisms such as a display screen, a printer, and the like. Through the user-interface 78, the computer system 74 may receive user commands, such as an instructions to start or stop applying the inventive process, and the computer system may provide output to the user, such as displayed or printed text or graphics that directs the user to make a particular adjustment to sector power in accordance with the invention.

Processor 80 comprises one or more general-purpose processors (e.g., INTEL microprocessors) and/or one or more special-purpose processors (e.g., discrete digital signal processing units or other logic circuits). And data storage 82 comprises volatile and/or non-volatile storage components, such as optical, magnetic or other memory or disc storage, which can be integrated in whole or in part with processor 80. As shown in the figure, data storage 82 contains program instructions 86 that are executable by processor 80 to carry out various functions described herein. (Processor 70 may outsource some functions as well.) Further, in use, data storage 82 includes data 88 that is the subject of the present analysis, such as RF performance data, sector-power data, and so forth.

Figure 5:
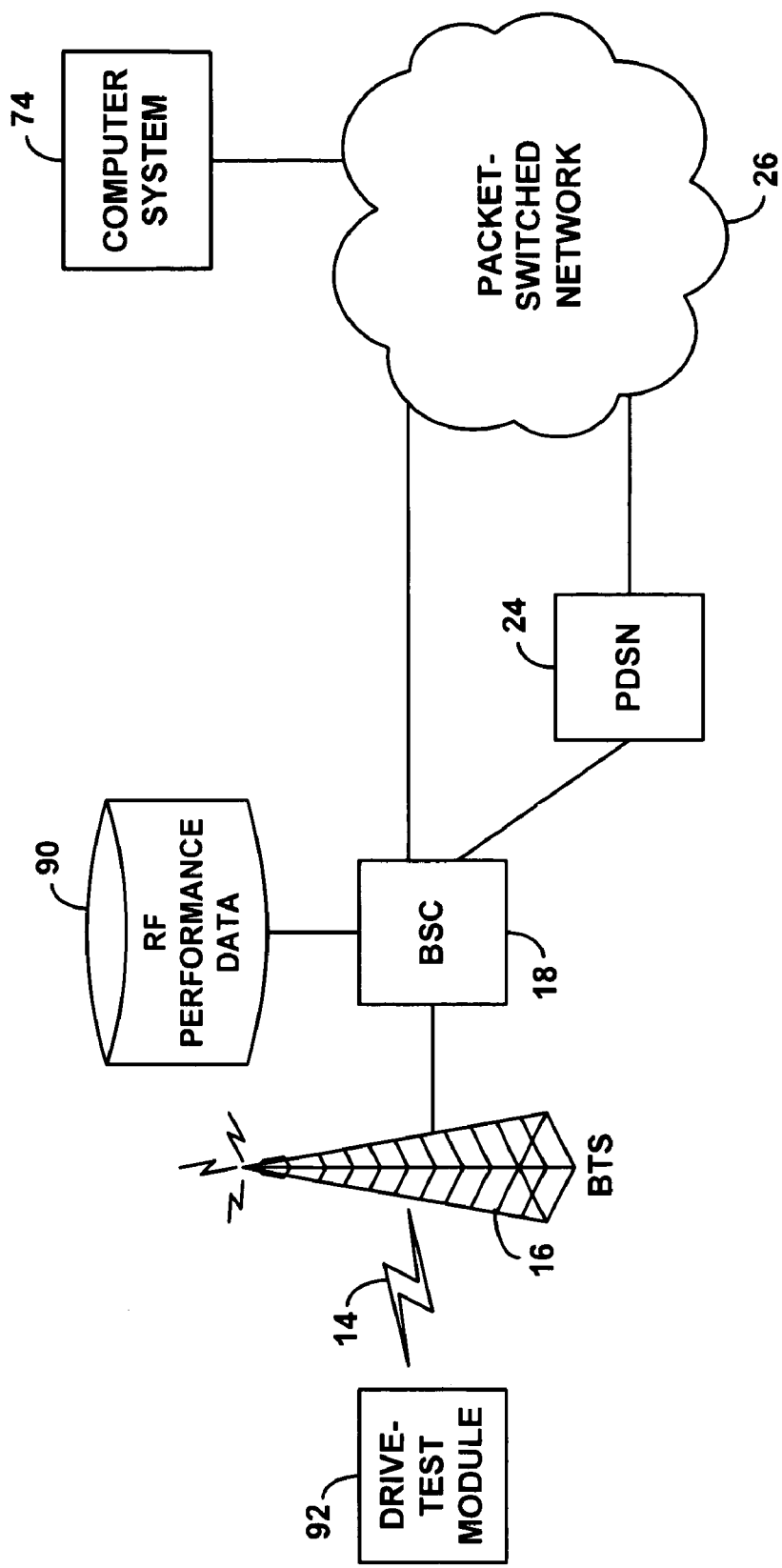
FIG. 5 is a block diagram depicting a network arrangement in which the computer system of FIG. 4 can be implemented.

In a preferred embodiment, the computer system 74 is in network communication with one or more base stations, such as BSC 18 for instance, so that the computer system 74 can receive network performance data from the base station(s) and, further, provide the base station(s) with instructions to adjust sector power in an automated manner. FIG. 5 depicts a variation of the network arrangement of FIGS. 1 and 2, to illustrate how computer system 74 could be interconnected by way of example.

As shown in FIG. 5, computer system 74 sits as a node (or multiple nodes) on packet-switched network 26. Further, BSC 18 sits as a node on packet-switched network 26 as well; that is, BSC preferably includes a network interface card and is coupled by a suitable cable link with a router on network 26. As additionally shown, BSC 18 includes or has access to a set of RF performance data 90, such as data regarding served mobiles and data-rates per sector over time. BSC 18 may report the RF performance data 90 incrementally to computer system 74 over packet-switched network 26, through pushing or pulling, e.g., by FTP or HTTP communication.

In addition, FIG. 5 depicts in place of mobile station 12 an example programmable drive test unit 92 that is set to collect and report RF performance data from the perspective of mobile station 12. Such units are available from companies including Agilent Technologies and Willtech International, for instance. Drive test unit 92 may report RF performance data to computer system 74 over packet-switched network 26, using a wireless packet-data connection as described above for instance.

The following sections address in more detail the functions depicted generally in the flow chart of FIG. 3. As noted above, this implementation is described by way of example only, and variations are possible. For instance, although the description refers to the implementation in terms of IS-856 and IS-2000, the implementation could be applied by analogy with respect to one or more air interface protocols.

a. Collection of RF Performance Data

In a preferred embodiment of the invention, the computer system 74 will collect data that indicates RF settings and RF usage over time throughout a market area of interest, and the computer system will use that data as a basis to identify areas of sector overlap and to determine what power level adjustments to make in an effort to reduce pilot pollution. One source of this data may be drive testing, in which drive-test modules are transported throughout the market area to record and report various RF conditions per time and geographic point. Another source of this data may be radio access network (RAN) infrastructure data, such as base station (e.g., BTS and/or BSC) records for instance.

In a manner well known in the art, drive-test modules (such as module 92 depicted in FIG. 5) can be mounted in courier vehicles that travel throughout the market area or can be transported more manually by technicians moving throughout the area. Further, the modules can be wholly automated in that they automatically collect data and automatically report the collected data over a wireless connection (e.g., a wireless packet-data connection) to the computer system 74 (or to a server that makes the data accessible to the computer system 74). Alternatively, the modules can collect and store data, and the data can later be manually transferred over a wireless or cable connection to the computer system 74.

In the preferred embodiment, one or more drive test modules will operate as hybrid terminals under IS-856 and IS-2000, and each data record that is collected and provided by the drive test modules may indicate (expressly or inherently) the following data:

(i) The geographic location (e.g., latitude/longitude) where the record was created, as determined by a GPS reading, for instance, (ii) The time (e.g., system time) when the record was created, (iii) The sectors whose pilots are detected at the location, (iv) The strongest $E_c/I_o$ measured at the location, (v) The C/I measured for each detected pilot at the location, (vi) An indication of which sector is the selected serving sector (i.e., the sector having the strongest C/I) at that location, (vii) The requested forward link data rate (DRC value) at that location, (viii) The received forward link data rate at that location, (ix) The transmitted reverse link data rate at that location, and (x) The perceived forward link packet error rate.

The drive test data records may include additional information as well and may vary from this list in other ways too (for example, omitting one or more of the above metrics).

Each data record that is collected by or from the RAN infrastructure data may indicate (expressly or inherently) the following data, preferably on a per-sector basis:

(i) The sector for which the data was collected,
(ii) The time (e.g., system time) when the data was recorded,
(iii) The number of mobile stations currently active in the sector,
(iv) The average forward data link data rate assigned to, and/or actually provided to, mobile stations in the sector,
(v) The average reverse link data rate received from mobile stations in the sector, and
(vi) The average perceived reverse link packet error rate in the sector.

The RAN infrastructure data may also include other data or may vary in other ways as well. As noted above, this RAN infrastructure data can be provided to the computer system 74 through pushing or pulling. For instance, to the extent the data is maintained in practice in the data storage medium 90 at or accessible by the base station, the computer system 74 could query the base station or could directly dip into that data storage medium (e.g., over a packet-data connection). Alternatively, the base station could be programmed to periodically transmit the latest data to the computer system 74.

The collection and reporting of the drive test and RF infrastructure data can be done regularly or periodically, so that the computer system 74 always has the latest set of data. Alternatively, the collection and reporting of the data could be triggered manually or in response to one or more other events.

b. Dividing Data into Geographic Regions

In the preferred embodiment, the computer system 74 will employ a mapping program (such as the mapping programs available from MapInfo Corporation, for instance) to geographically divide the collected drive test data into a grid of cells or "bins" or to otherwise subdivide the market area into geographic regions that can be considered during the inventive analysis. Preferably, each region will be small enough that the region would be unlikely to contain more than one set of overlapping sectors and thus would be unlikely to contain more than one discrete instance of pilot pollution (if any). For a typical cellular communication system, by way of example, each region can be on the order of 20 to 30 meters in diameter (if circular) or per side (if square), but any other desired dimension could be used. Further, all of the regions can be the same size, or certain regions can differ in size from others, possibly depending on factors such as population (e.g., rural vs. urban) in the area or the size of sectors in the area.

c. Filtering Data Based on Data Rate

In accordance with the exemplary embodiment, the computer system 74 will filter the drive test data to include just those geographic points or regions where the forward-link data rate was (e.g., on average) lower than a predefined data rate threshold. The predefined data rate threshold can be any data rate believed to be too low and thus problematic. The computer system can identify points having low forward-link data rate based on requested data rate (DRC) and/or actually received data rate, as indicated by the drive test data. Further, the computer system can conduct this filtering on a per-geographic-point basis or a per-region basis (e.g., averaging the data rate data for all of the drive test data falling in a given region). The result of this step will be a first subset of data.

d. Filtering Data to Focus on Excessive Interference

Next, the computer system will filter the first subset of data in an effort to limit the data to geographic points or regions where the low forward link data rate is likely the result of excessive signal interference such as pilot pollution, rather than being likely the result of some other factor such as excessive user-demand.

One way to perform this step is to eliminate geographic data points or regions where the low forward link data rate is likely the result of high traffic (and, thus, more sparsely allocated resources) rather than likely the result of noise caused by pilot pollution. To do this, (i) for each point in the drive test data, the computer system may note which sector or sectors (pilots) were detected at the point and at what time, and (ii) based on the RAN infrastructure data, the computer system may determine the total number of mobile stations (users) that were operating in those particular sectors at that time. The computer system may then compare that total number of users to a predefined threshold number of users (e.g., an average number expected at that time of day). If the total number exceeds the predefined threshold, then the computer system can eliminate the data point; alternatively, on a per-region basis, the computer system can eliminate a region if the average number of users in the sectors detected at points throughout the region exceeds the predefined threshold.

This user-threshold analysis could, alternatively, be applied only with respect to the selected serving sector at each geographic point, rather than with respect to all sectors detected at the geographic point. That is, for the selected serving sector, the computer system can determine from the RAN infrastructure data if the number of mobile stations being served by the sector exceeds a predefined threshold, and, if so, the computer system can eliminate the data point. And again, this same analysis alternatively could be conducted on a per-region basis. In any event, the result of this step will be a second subset of data.

Another way to perform this step of identifying points or regions where the low data rate is likely a result of excessive signal interference is to limit the data to those geographic points or regions that have more than a threshold packet error rate (on the forward link and/or reverse link), i.e., to eliminate geographic points or regions having less than a threshold packet error rate. High packet error rate may reflect poor RF conditions (e.g., a high level of interference), and low packet error rate may reflect acceptable RF conditions. To do this, for each point in the drive test data, the computer system may note the perceived packet error rate on the forward link and/or the reverse link. For each data point, the computer system may then compare the perceived packet error rate with a predefined threshold packet error rate and may eliminate the data point if the packet error rate is below the threshold (reflecting that RF conditions were probably not bad at that point). Alternatively, the computer system may conduct this analysis on a per-region basis, eliminating a region if the average perceived packet error rate for all data points throughout the region falls below the predefined threshold packet error rate. This too would result in a second subset of data.

Still another way to perform the step of identifying points or regions where the low data rate is likely the result of excessive signal interference is to limit the data to those geographic points or regions that have less than a threshold reverse link data rate, i.e., to eliminate those geographic points or regions having more than a threshold reverse link data rate. In this regard, a high reverse link data rate may reflect acceptable RF conditions as a general matter, whereas a low reverse link data rate together with a low forward link data rate may reflect poor RF conditions. Thus, if the reverse link data rate is below a threshold when the system has already determined that the forward link data rate is below a threshold, then it is reasonable to conclude that RF conditions may be poor. To conduct this analysis, for each point in the drive test data, the computer system may note the reverse link data rate as measured by the drive test data and may eliminate the point if the reverse link data rate is above a predefined threshold level. Alternatively, the computer system may remove an entire region if the average reverse link data rate in the region is above the predefined threshold level. Once more, this would result in a second subset of data.

Note that the various mechanisms described above for filtering the first subset of data so as to produce the second subset of data can be combined together as well, such as carried out in series for instance. By way of example, the computer system can first filter the data based on number of users, the computer system can next filter the data based on extent of packet error rate, and the computer system can next filter the data based on reverse link throughput.

e. Selecting a Region of Interest

After establishing the second subset of data, the computer system 74 will next rank the regions in the filtered data set in order to identify a region that can best benefit from an adjustment of sector power. In accordance with the exemplary embodiment, the computer system can select the region that has the lowest average $E_c/I_o$, as a low average $E_c/I_o$, would indicate that the primary serving sector in the region is substantially impacted by interfering pilots from other sectors. Thus, to carry out this function, the computer system 74 may simply compute an average $E_c/I_o$ for each region, and the computer system may then select the region having the lowest average $E_c/I_o$.

In an alternative embodiment, the computer system could select a region of interest in some other manner. For instance, the computer system could select a region of interest based on the number of sectors serving the region, based on the average forward link data rate in the region, or even randomly. Other examples are possible as well. Further, the computer system could alternatively select more than one region of interest in which sector power should be adjusted. For instance, the computer system could select the highest N ranked regions as regions of interest.

f. Determining a Power Adjustment

Next, the computer system 74 will determine one or more sector power adjustments to make in one or more sectors that impact the region of interest. The goal of this step is to try to reduce pilot pollution in the region, without diminishing other aspects of RF performance. In the preferred embodiment, to do this, the computer system will determine which sector is the most common serving sector in the region, and the computer system will then direct a sector power reduction in one or more other sectors serving the region.

By way of example, based on the drive test data, the computer system may identify (i) which sectors serve the region and (ii) which sector is the one most commonly selected as a serving sector in the region. In the event of a tie among sectors (e.g., two or more sectors serve mobile stations in the region an equivalent amount), the system may itself select (e.g., randomly or on some other basis) one of the tied sectors to be considered the selected serving sector. Of the one or more other sectors covering the region, the computer system may then select the sector that has the highest average $E_c/I_o$, reflecting the highest pilot signal over the total pilot energy. And the computer system may determine that the power of that sector (or at least the pilot power of that sector) should be reduced. Alternatively, the computer system can select more than one non-serving sector in the region, such as two non-serving sectors having the highest $E_c/I_o$, for instance.

In the preferred embodiment, the computer system will then provide an output signal specifying that the power should be reduced in each selected sector. The output signal from the computer system can be provided directly to an entity that controls the power in the sector(s) whose power is to be reduced, such that power can then be automatically reduced in each such sector. For instance, the computer system 74 can send the output signal over packet-switched network 26 to BSC 18, and BSC 18 can make the specified power adjustment(s) by directing change(s) in the gain of one or more of power amplifiers 50, 52, 54. Alternatively or additionally, the system can provide the output signal on a display screen and/or a printed report, and a technician can read the report and then manually make the designated power adjustment(s) in the designated sector(s).

The extent of power reduction suggested (or effected) by the computer system 74 is largely a matter of choice. The reason for reducing power in one or more sectors cover the region of interest is to reduce the interference to the primary serving sector covering the region. Thus, the extent of power reduction in the can be an extent that is sufficient to raise the C/I of the primary serving sector to a level (e.g., on average) that would provide a desired forward link data rate.

g. Iterating

After adjusting the power allocation for one or more sectors in one or more regions of interest, the computer system will then preferably repeat the above process, and the computer system will continue to do so until reaching a stop condition, such as a degradation (rather than improvement in performance). In particular, the computer system will preferably (i) collect new drive test data and RAN infrastructure data, (ii) filter the data as above, (iii) select one or more regions of interest, and (iv) direct one or more associated power adjustments.

In each iteration, the computer system will first determine whether the adjustment(s) that were made to the region of interest in the preceding iteration resulted in a degradation of performance, rather than an improvement of performance. To do so, the computer system will preferably compare the region's average forward link data rate in the current iteration to the region's average forward link data rate in the immediately preceding iteration. If the average forward link data rate decreased, then the computer system will preferably stop the process and direct the latest change in sector power to be reversed. If the average forward link data rate increased (or at least did not decrease), on the other hand, then the computer system will preferably proceed with the iteration in the manner described above.

3. Conclusion

An exemplary embodiment of the present invention has been described and illustrated. It will be understood of course that changes and modifications to the embodiment described can be made consistent with the invention as claimed.

We claim:

1. In a wireless communication system comprising one or more base stations that radiate to define a plurality of sectors in which mobile stations can engage in radio frequency (RF) communication with the one or more base stations, wherein the sectors reside within a market area and the market area defines a plurality of geographic regions, a method comprising:

(a) collecting RF performance data for the wireless communication system, wherein the RF performance data includes data records indicating at least (ii) forward link data rate per geographic point and (ii) one or more pilot strength measurements per geographic point;

(b) filtering the RF performance data to be limited to data records that indicate a forward link data rate lower than a designated forward link data rate threshold, and further filtering the RF performance data to be limited to data records where the indicated forward link data rate is likely the result of signal interference;

(c) using the pilot strength measurements in the data records of the filtered RF performance data as a basis to select at least one geographic region in which to adjust sector power; and (d) providing an output signal directing at least one sector power adjustment to be made in the at least one selected geographic region.

2. The method of claim 1, further comprising:

(e) malting the at least one sector power adjustment;

(f) repeating step (a);

(g) malting a determination of whether the at least one sector power adjustment resulted in degradation of RF performance; and (h) repeating steps (b) through (d) if the determination is that the at least one sector power adjustment did not result in degradation of RF performance.

3. The method of claim 1, wherein collecting the RF performance data comprises collecting drive test data and radio access network infrastructure data.

4. The method of claim 3, further comprising dividing the collected drive test data per geographic region, and performing step (b) on a per-geographic-region basis.

5. The method of claim 3, wherein the radio access network infrastructure data comprises data selected from the group consisting of (i) identification of sector for which data is collected, (ii) time at which data is collected for the sector, (iii) number of mobile stations active in the sector, (iv) average forward link data rate in the sector, (v) average reverse link data rate in the sector, and (vi) average perceived reverse link data rate in the sector.

6. The method of claim 3, wherein the drive test data comprises data selected from the group consisting of (i) geographic location of data collection, (ii) time of data collection at the location, (iii) identification of sectors whose pilots are detected at the location, (iv) $E_c/I_o$ of each detected pilot at the location, (v) C/I of each detected pilot at the location, (vi) identification of selected serving sector at the location, (vi) requested forward link data rate at the location, (vii) received forward link data rate at the location, (viii) transmitted reverse link data rate at the location, and (x) perceived forward link packet error rate at the location.

7. The method of claim 1, wherein filtering the RF performance data comprises filtering the RF performance data on a per-geographic-point or per-geographic-region basis.

8. The method of claim 1, wherein filtering the RF performance data to be limited to data records where the indicated forward link data rate is likely the result of signal interference comprises one or more of the following functions:

eliminating data records, or geographic regions of data records, where the indicated low forward link data rate is likely the result of high traffic;

eliminating data records, or geographic regions of data records, having less than a threshold packet error rate; and eliminating data records, or geographic regions of data records, having more than a threshold reverse link data rate.

9. The method of claim 8, wherein filtering the RF performance data to be limited to data records where the indicated forward link data rate is likely the result of signal interference comprises eliminating data records, or geographic regions of data records, where the indicated low forward link data rate is likely the result of high traffic.

10. The method of claim 9, wherein eliminating data records where the indicated low forward link data rate is likely the result of high traffic comprises:

for each data record, identifying each sector whose pilot was detected at the geographic point at a given time;

for at least one of the identified sectors, determining how many mobile stations were operating in the sector at the given time, and making a comparison of the determined number of mobile stations to a threshold number of mobile stations.

11. The method of claim 10, wherein eliminating data records where the indicated low forward link data rate is likely the result of high traffic further comprises:

eliminating at least one data record if the comparison indicates that the determined number of mobile stations is higher than the threshold number of mobile stations.

12. The method of claim 10, wherein eliminating data records where the indicated low forward link data rate is likely the result of high traffic further comprises:

eliminating a geographic region of data records if an average number of mobile stations in sectors whose pilots were detected at geographic points throughout the region is higher than the predefined threshold number of mobile stations.

13. The method of claim 1, wherein filtering the RF performance data to be limited to data records where the indicated forward link data rate is likely the result of signal interference comprises eliminating data records, or geographic regions of data records, having less than a threshold packet error rate.

14. The method of claim 1, wherein filtering the RF performance data to be limited to data records where the indicated forward link data rate is likely the result of signal interference comprises eliminating data records, or geographic regions of data records, having more than a threshold reverse link data rate.

15. The method of claim 1, wherein using the pilot strength measurements in the data records of the filtered RF performance data as a basis to select at least one geographic region in which to adjust sector power comprises:

using the filtered RF performance data to determine an average $E_c/I_o$ per geographic region; and selecting the geographic region having the lowest determined average $E_c/I_o$.

16. The method of claim 1, further comprising determining the at least one sector power adjustment to be made.

17. The method of claim 16, wherein determining the at least one sector power adjustment to be made comprises:

for each of the at least one selected geographic region, identifying a sector that is second to most often selected as a serving sector; and determining that sector power should be reduced in the identified sector, to reduce signal interference.

18. In a wireless communication system comprising one or more base stations defining a plurality of wireless coverage areas in which mobile stations can engage in radio frequency (RF) communication with the base stations, a method comprising:

collecting drive test data for the wireless communication system, wherein the drive test data includes geographic markers indicative of where the data was collected;

dividing the drive test data into a set of geographic regions, based on the geographic markers;

filtering the drive test data to establish a first subset of data that includes just geographic points or regions where forward link data rate is lower than a forward link data rate threshold;

filtering the first subset of data to establish a second subset of data that includes just geographic points or regions where low forward link data rate likely results primarily from pilot pollution;

using the second subset of data to select a region of interest from among the regions; and adjusting power output of one or more wireless coverage areas present within the region of interest, in order to increase pilot signal dominance of a given wireless coverage area present within the region of interest.

* * * * *